United States Patent
Taheri et al.

(10) Patent No.: US 7,816,879 B2
(45) Date of Patent: Oct. 19, 2010

(54) HIGH TORQUE MOVABLE BARRIER ACTUATION AT LOW SPEEDS UTILIZING A HUB MOTOR

(75) Inventors: Hassan Taheri, Dana Point, CA (US); Jonathan Becerra, Cypress, CA (US)

(73) Assignee: Viking Access Systems, LLC, Irvine, CA (US)

( * ) Notice: Subject to any disclaimer, the term of this patent is extended or adjusted under 35 U.S.C. 154(b) by 374 days.

(21) Appl. No.: 12/033,301

(22) Filed: Feb. 19, 2008

(65) Prior Publication Data
US 2009/0206777 A1   Aug. 20, 2009

(51) Int. Cl.
*G05D 3/00* (2006.01)
(52) U.S. Cl. .................. 318/466; 318/280; 318/283; 318/266
(58) Field of Classification Search ............. 318/280, 318/283, 266, 260, 465, 466, 286; 49/360, 49/263; 160/188; 340/521, 825.31
See application file for complete search history.

(56) References Cited

U.S. PATENT DOCUMENTS

| | | | |
|---|---|---|---|
| 4,340,799 A | 7/1982 | Ueda et al. | |
| 4,420,703 A | 12/1983 | Adam et al. | |
| 4,450,545 A | 5/1984 | Kishi | |
| 4,501,012 A | 2/1985 | Kishi | |
| 4,556,994 A | 12/1985 | Kawasaki | |
| 4,673,848 A | 6/1987 | Hagiwara et al. | |
| 4,684,853 A | 8/1987 | Coash | |
| 4,937,855 A | 6/1990 | McNab | |
| 5,134,350 A | 7/1992 | Mahoney | |
| 5,706,399 A | 1/1998 | Bareis | |
| 5,744,896 A | 4/1998 | Kessinger, Jr. et al. | |
| 6,108,977 A * | 8/2000 | Payne et al. .............. | 49/360 |
| 6,161,005 A | 12/2000 | Pinzon | |
| 6,218,956 B1 * | 4/2001 | Davis et al. ................. | 340/5.2 |
| 6,229,276 B1 | 5/2001 | Fitzgibbon et al. | |
| 6,239,569 B1 | 5/2001 | Fitzgibbon et al. | |
| 6,257,303 B1 * | 7/2001 | Coubray et al. ............. | 160/188 |
| 6,525,659 B2 | 2/2003 | Jaffe et al. | |
| 6,532,038 B1 | 3/2003 | Haring | |
| 6,614,200 B2 | 9/2003 | Fowler et al. | |
| 6,618,993 B2 | 9/2003 | Burke | |
| 6,624,400 B2 | 9/2003 | Chun | |
| 6,788,386 B2 | 9/2004 | Cox et al. | |
| 6,832,076 B2 | 12/2004 | Study | |
| 6,882,715 B2 | 4/2005 | Hom | |
| 6,933,843 B1 | 8/2005 | Hom et al. | |

(Continued)

OTHER PUBLICATIONS www.konarka.com, website, Mar. 5, 2007.

(Continued)

*Primary Examiner*—Paul Ip
(74) *Attorney, Agent, or Firm*—Jafari Law Group, Inc.; David V. Jafari

(57) ABSTRACT

The present invention is a system for high torque operation of a movable barrier utilizing a compact hub motor device, which may be directly coupled to a movable barrier without the use of additional gearing systems. The flat geometry provides high dynamic acceleration with short electrical and mechanical time constants, and its planetary gearing system implemented within the device allows for compact, more efficient access systems. Eliminating a gear system in accordance with the present invention lowers maintenance requirements, increases efficiency, and streamlines operation of movable barriers.

2 Claims, 13 Drawing Sheets

U.S. PATENT DOCUMENTS

| | | | |
|---|---|---|---|
| 6,966,147 B2 | 11/2005 | Solowiej | |
| 6,998,977 B2 | 2/2006 | Gregori | |
| 7,040,605 B2 | 5/2006 | Lappen | |
| 7,042,183 B2 | 5/2006 | Fitzgibbon et al. | |
| 7,057,547 B2 | 6/2006 | Olmsted et al. | |
| 7,062,879 B2 | 6/2006 | Wenzl et al. | |
| 7,064,505 B2 | 6/2006 | Sato | |
| 7,116,072 B1 | 10/2006 | Murray et al. | |
| 7,138,912 B2 * | 11/2006 | Fitzgibbon et al. | 340/521 |
| 7,170,248 B2 | 1/2007 | Tsui et al. | |
| 7,170,998 B2 | 1/2007 | McLintock et al. | |
| 7,194,412 B2 | 3/2007 | Mays | |
| 7,197,278 B2 | 3/2007 | Harwood et al. | |
| 7,208,897 B2 * | 4/2007 | Hotto et al. | 318/466 |
| 7,226,041 B2 * | 6/2007 | Ledford | 254/342 |
| 7,264,417 B1 | 9/2007 | Nasatka | |
| 7,436,141 B2 | 10/2008 | Perez et al. | |
| 2002/0067245 A1 | 6/2002 | Campbell | |
| 2003/0015889 A1 | 1/2003 | Stolle et al. | |
| 2003/0197914 A1 | 10/2003 | Cox et al. | |
| 2004/0210327 A1 | 10/2004 | Robb | |
| 2004/0222913 A1 | 11/2004 | Olmsted et al. | |
| 2004/0239496 A1 | 12/2004 | Fitzgibbon | |
| 2005/0034374 A1 | 2/2005 | Ebbe et al. | |
| 2005/0253731 A1 | 11/2005 | Fitzgibbon et al. | |
| 2005/0258934 A1 | 11/2005 | Buck | |
| 2005/0288840 A1 | 12/2005 | Suzuki | |
| 2006/0113935 A1 * | 6/2006 | Angiuli et al. | 318/280 |
| 2006/0213362 A1 | 9/2006 | Heertjes et al. | |
| 2006/0237150 A1 | 10/2006 | Olmsted | |
| 2007/0035074 A1 | 2/2007 | Vervoordeldonk et al. | |
| 2007/0052946 A1 | 3/2007 | Heiland | |
| 2007/0093943 A1 | 4/2007 | Nelson et al. | |
| 2007/0146675 A1 | 6/2007 | Butler | |
| 2007/0188724 A1 | 8/2007 | Jacobs et al. | |
| 2007/0222401 A1 | 9/2007 | Trumper et al. | |
| 2008/0061948 A1 | 3/2008 | Perez | |
| 2008/0094186 A1 | 4/2008 | Perez | |
| 2008/0106370 A1 | 5/2008 | Perez | |
| 2008/0271859 A1 * | 11/2008 | Kourtesis et al. | 160/310 |
| 2009/0085719 A1 | 4/2009 | Perez | |
| 2009/0188166 A1 | 7/2009 | Taheri | |
| 2009/0189560 A1 | 7/2009 | Taheri | |

OTHER PUBLICATIONS

Viking Access Systems, "Vehicle Gate Operator Q-4" Feb. 2007; Retrieved from Internet <http://web.archive.org/web/20070630124920/http://vikingaccess.com/Q4.html> p. 1.

* cited by examiner

HIGH TORQUE MOVABLE BARRIER ACTUATION AT LOW SPEEDS UTILIZING A HUB MOTOR

TECHNICAL FIELD OF THE INVENTION

The present invention relates in general to a system for high torque operation of a movable barrier utilizing a compact hub motor, and in particular, a movable barrier operator comprising an electromagnetic motor that is retrofitted with internal gearing capable of high torque at very low speeds, which may be directly coupled to a movable barrier without the use of additional external gearing systems.

BACKGROUND OF THE INVENTION

Typically, automatic and manual operation of movable barriers, such as garage doors or gates, has included a gear system which allows for easy movement of a barrier. Many developments in the gate operator industry have transformed movable barriers, including the implementation of various kinds of motors and gear systems to operate one or more gates.

One of the problems encountered in the gate operator industry is controlling actuation to achieve smooth, efficient, and effective operation of movable barriers. The current practice typically must implement various complex systems of gears and electronics in order to provide the adequate amount of torque at the low speeds these operators usually run to actuate a movable barrier.

FIG. 1 is a block diagram of the various components comprising a movable barrier operator typical of the ones found in the prior art. Typically, the prior art (as shown) comprises of power source 100, charger 101, battery 102, controller 103, sensors 104, switch array 105, phase control mechanism 106, motor drive 107, motor 108, c-phase mounting 109, gear box 110, output shaft 111, and a belt system 112, which connects to and operates movable barrier 113.

Systems with conventional motors usually include phase control mechanism 106 to monitor and alter the frequency of voltage applied to the motor—furthermore these motors fail to provide high torque at low speeds. The gate operation industry has therefore implemented the use of gear box 100 and belt system 112 to accomplish the torque required to actuate movable barrier 113. These complex systems seek to regulate smooth actuation but still remain inadequate.

Adding belt system 112, chains, or gear boxes, increases the volume of the system, adding more moving parts and essentially additional variables for possible system malfunctions. Manufacturers in the gate operation industry have attempted to alleviate this problem but those methods remain inadequate for the following reasons.

Some manufacturers have tried to implement c-phase mounting 109 techniques between motor 108 and gear box 110, however, this method raises the possibility of oil or grease leakage that may damage a gate operating system—at the very least increased maintenance and use of additional personnel is required to install and service these access systems.

Due to the inadequate methods and systems used to operate access systems (particularly in industrial applications), the gate operation industry is flooded with gate operators that are large, heavy, and complex—requiring relatively large motors and big gear boxes. For these reasons and others, the prior art has been inadequate to suit the needs of gate operator users, installers and manufacturers.

Therefore, there is a need in the art for a system that utilizes fewer components to achieve higher precision actuation of movable barriers without complex gear systems and electronics. It is desirable to develop a movable barrier operator that contains fewer parts to minimize maintenance and potential malfunctions, while retaining the desired control of the operator at low speeds and generating the desired high torque during actuation. It is to these ends that the present invention has been developed.

SUMMARY OF THE INVENTION

To minimize the limitations in the prior art, and to minimize other limitations that will be apparent upon reading and understanding the present specification, the present invention describes a system for high torque operation of a movable barrier utilizing a compact hub motor.

The present invention focuses on a system for high torque actuation of a movable barrier utilizing a hub motor. These motors are compact and implement their own internal gearing systems that allow the device to be directly coupled to a movable barrier applicable in many types of access systems. Their internal gearing, and typically in planetary configuration, allows for a flat motor that is compact and delivers very high torque at very low speeds.

A movable barrier operator, in accordance with the present invention, comprises a movable barrier; a hub motor, wherein said hub motor further comprises at least one stator magnetically coupled to a rotor, and at least one internal gear rotably coupled to said rotor; a sprocket rotably coupled to said one or more internal gears; and a chain directly coupled to said sprocket and said movable barrier in a manner that said movable barrier moves at a substantially the same speed as a rotation speed of said sprocket.

An access system, in accordance with the present invention, comprises a movable barrier; and a hub motor directly coupled to said movable barrier so that said movable barrier moves at a substantially the same speed as a rotation speed of an output shaft of said motor.

Another access system, in accordance with the present invention, comprises a slide gate adapted to move on a track; a hub motor, wherein said hub motor further comprises at least one stator magnetically coupled to a rotor, and at least one or more internal gears rotably coupled to said rotor; a sprocket rotably coupled to said one or more internal gears; a chain directly coupled to said sprocket and said movable barrier in a manner so that said movable barrier moves at a substantially the same speed as a rotation speed of said sprocket, wherein said chain runs substantially parallel to said track; an idle wheel for maintaining said chain mechanically connected to said sprocket; a controller adapted to control said rotation of said hub motor; and a sensor connected to said controller, said sensor adapted to generate a signal after detecting a predefined event.

It is an objective of the present invention to provide a compact design capable of high torque at very low speeds.

It is another objective of the present invention to eliminate the need for additional gearing systems for high torque operations at low speeds.

It is yet another objective of the present invention to provide smooth, constant speed actuation of various types of movable barriers for different designs of access systems.

Finally, it is yet another objective of the present invention to provide a movable barrier operation system with minimal components and high versatility-applicable to a wide variety of applications.

These and other advantages and features of the present invention are described herein with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE DRAWINGS

Figure 1:
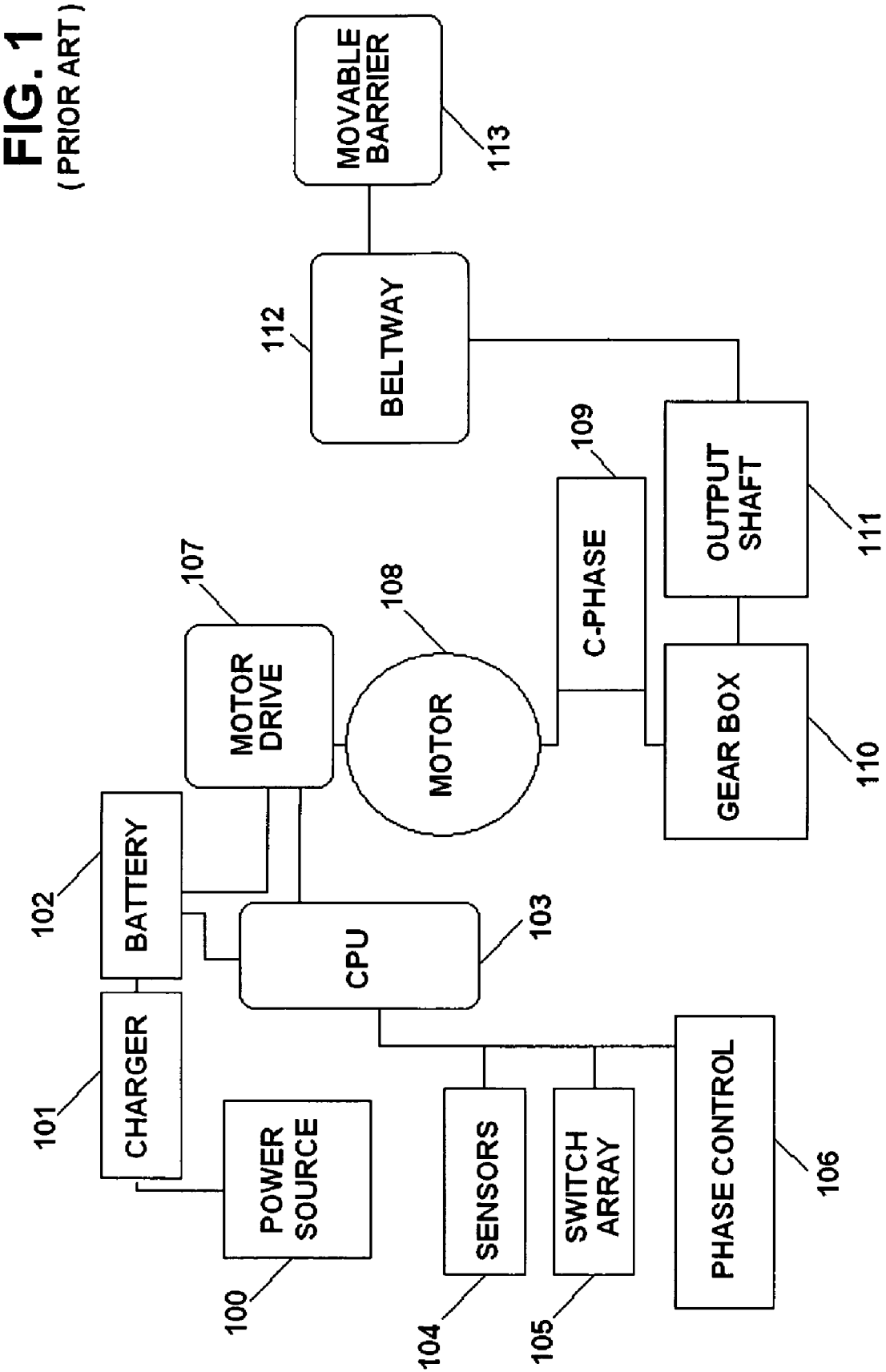
FIG. 1 is a block diagram of the various components comprising a movable barrier operator typical of the ones found in the prior art.

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the invention.

In the following detailed description, an access system is a system of one or more movable barriers positioned on any premises to provide access in or out of said premise, for example into a neighborhood, a building, a large compound, a small residence, an industrial site, an agricultural site, a roadway system, a parking structure, or any other type of premise for which controlled access may be desired.

Furthermore, in this disclosure, an access system may also include controlled access systems to airways, waterways, or even pipelines that control fluid or gas flow.

A movable barrier operator, or gate operator, can be any system that controls a barrier to an entry, an exit, or a view. The movable barrier could be a door for a small entity (i.e. a vehicle), or a gate for a large entity (i.e. a building) which can swing out, slide open, pivot, fold or even roll upwards.

In the present disclosure, a movable barrier operator in accordance with the present invention moves a barrier from an open position to a closed position and vice-versa, retrofitted with a hub motor to actuate or operate the barrier without the need for an external gearing system.

A hub motor, as described herein, may be any type of motor that uses a pancake motor configuration, usually, and without limiting the scope of the present invention, making the motor wider than longer. This is desirable over cylindrically configured motors due to a pancake motor's compact design. Typically, the direction of the magnetic flux is axial, that is, parallel to the axis of rotation, which is an advantage when implementing an internal planetary gearing system.

Thus, a hub motor, in accordance with the present invention, is a device comprising an electromagnetic motor and an internal gear system in a single compact configuration. A hub motor may comprise a DC brush motor, a DC brushless motor, or any permanent magnet motor in which magnets are specially arranged so as to give the motor a flat, compact shape.

Hub motors may be customized depending on the necessary load or weight of a particular movable barrier, which makes these types of motors highly adaptable. For example, a hub motor may be adjusted by known methods to exert a specified amount of force. Furthermore, the internal gearing may be configured in any known way; in an exemplary embodiment, a planetary gear configuration may be desirable to achieve a flat compact design.

The fact that these motors can be configured with internal gearing is an advantage over conventional movable barrier operator motors that utilizes external gear boxes, belt systems, or similar additional components, to achieve the desired torque at low speed actuation of movable barriers.

By implementing a hub motor in accordance with the present invention, gear box 110 and beltway 112 may be eliminated. Eliminating gear box 110 will obviously further eliminate the need for an installer to utilize c-phase mounting 109 techniques. Removal of such parts creates a more compact design in which work efficiency may be maximized, maintenance may be significantly minimized, and with less components, the improved movable barrier operator is more versatile; a single device capable of adapting to numerous embodiments.

Furthermore, a hub motor in accordance with the present invention has high torque, which enables a movable barrier operator to actuate a gate (for example) without the need for phase control mechanism 106; devices commonly used to regulate a voltage frequency so that actuation is smooth throughout and in between opening and closing commands.

Figure 2:
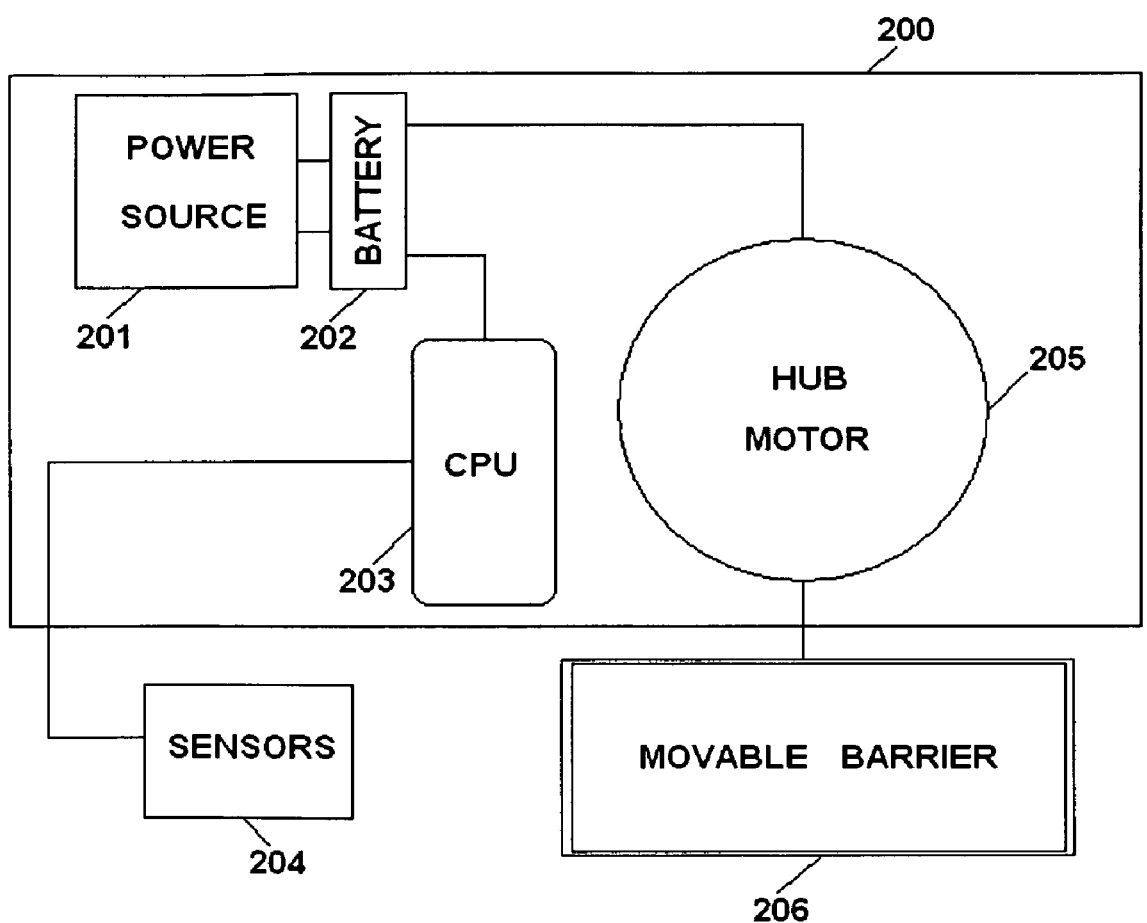
FIG. 2(a) is a block diagram illustrating how implementation of a hub motor eliminates the need for various components traditionally found in the prior art.
FIG. 2(b) is a diagram illustrating an exemplary configuration of a hub motor which may be coupled directly to a movable barrier, in accordance with practice of the present invention.
Figure 2:
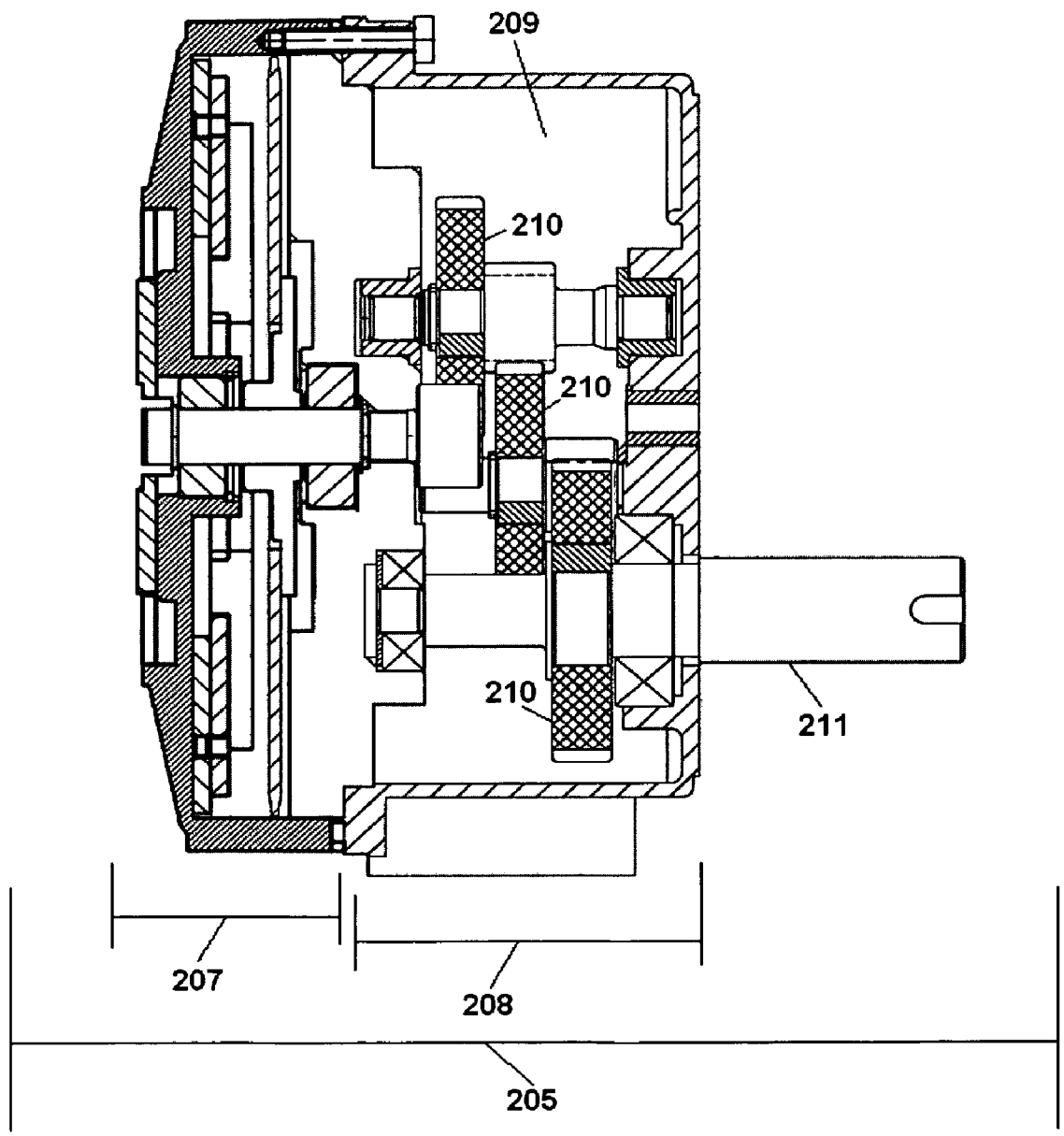

For example, FIG. 2 is a block diagram illustrating how implementation of a hub motor eliminates the need for various components traditionally found in the prior art.

The illustrated embodiment comprises a basic system to operate movable barrier 206 without the need for additional components, for example, motor drive 107, gear box 110, belt system 112 have been removed, motor 108 replaced with hub motor 205. Movable barrier operator 200 may be any type of movable barrier operator without deviating from the scope of the present invention. Thus, a hub motor such as hub motor 205 may be implemented in a wide variety of applications for access systems in various fields.

Movable barrier operator 200 comprises of minimal components and thus may be compacted to fit numerous designs and ultimately streamline prior designs that commonly require many components and sub-components.

Typically, movable barrier operator 200 comprises power source 201, battery 202, controller 203, and hub motor 205. Additionally, and also typical, is sensors 204 which are utilized to detect or sense an event, for example a vehicle approaching movable barrier 206.

Hub motor 205 is typically coupled directly to movable barrier 206 and wired to controller 203 where components to monitor and control motor 200 may be installed, including any additional features necessary to operate movable barrier 206, for example sensors 202.

In an exemplary embodiment, hub motor 206 is a brush motor which utilizes electromagnetic forces combined with an internal planetary gearing system to provide movable barrier 200 with high enough torque to smoothly actuate movable barrier 206 at very low speeds.

Power source 201 may be any known power source such as a gas powered generator, an electrical power supply from power lines, a photovoltaic power supply such as from power cells, or any other source of power capable of supplying and charging battery 202 with enough power to energize hub motor 205 and controller 206. Battery 202 is preferably a rechargeable battery to allow movable barrier operator 200 a back-up power supply.

Sensors 204 may be inductive loop sensors, capacitance sensors, a magnetic sensor, an ultrasonic sensor, a retro reflective sensor, an optical sensor, a photo beam sensor, an infrared sensor, or any other type of sensors known in the art without departing from the scope of the present invention.

The elimination of a gear box means the illustrated movable barrier operator may be implemented for a wide variety of applications. For example, and without limiting the scope of the present invention, movable barrier operator 200, may be a swing gate operator, a window operator, a garage door operator, a slide gate operator, a roll-up door operator, a sliding-door operator, a regular door operator, a revolving door operator, a car door operator, or a car top operator for a convertible vehicle.

By eliminating the need for a gear box 110 and even the need for a beltway system 112, hub motor 205 may be virtually directly coupled to any movable barrier with few modifications. Thus, it is preferable that hub motor 205 be manufactured in a small compact size for most embodiments, however, having a larger size hub motor for other applications would not deviate from the scope of the present invention, for example, hub motor 205 may be a large motor installed directly to a movable water barrier, wherein controller 203 and sensors 204 are utilized to control water flowing through a dam. Other such embodiments wherein large barriers are utilized may require larger versions of hub motor 205.

Implementing a gear box or gear system does not necessarily deviate from practice of the present invention however, and there may be some applications in which some gearing may be helpful. In such cases, the advantages of a compact design may be compromised, but the internal gearing of hub motor 205 will nevertheless provide still more torque and power than conventional operators utilizing conventional motors.

FIG. 2(b) is a diagram illustrating an exemplary configuration of one embodiment of hub motor 205 that may be coupled directly to movable barrier 206 in accordance with practice of the present invention, wherein at least one stator and a rotor are directly coupled to a system of planetary gears for rotating hub motor 205's output shaft 211.

Hub motor 205 comprises of motor components 207 and internal gearing system 208 which helps drive output shaft 211 with high torque. Typically, motor components 207 comprises of at least one stator and rotor which are magnetically coupled together. Motor components 207 may also be a permanent magnet (PM) motor, a PM brush motor, a PM brushless motor, or any type of DC motor, without deviating from the scope of the present invention. Motor components 207 are coupled to internal gearing system 208 to provide a mechanical advantage, thus multiplying the applied force of motor components 207 and generating the desired torque through output shaft 211.

Internal gearing system 208 further comprises of an internal cavity 209 in which a series of gears 210 are configured to provide the mechanical advantage at output shaft 211. Gears 210 may be any type of gear configuration, however, in an exemplary embodiment, gears 210 are in planetary configuration so that cavity 209 is reduced in size, making hub motor 205 of a flatter more compact design.

When hub motor 205 is directly coupled to movable barrier 206, movable barrier 206 will be able to move at substantially the same speed as the rotation of output shaft 211. The advantage being that external gearing components or similar external mechanisms used to give conventional motors the desired mechanical advantage may be eliminated thereby reducing costs and minimizing maintenance of movable barrier operator 200.

In turn, with reference to the remaining figures, a number of examples of other various embodiments, including some examples already disclosed, will be discussed in greater detail.

Figure 3A:
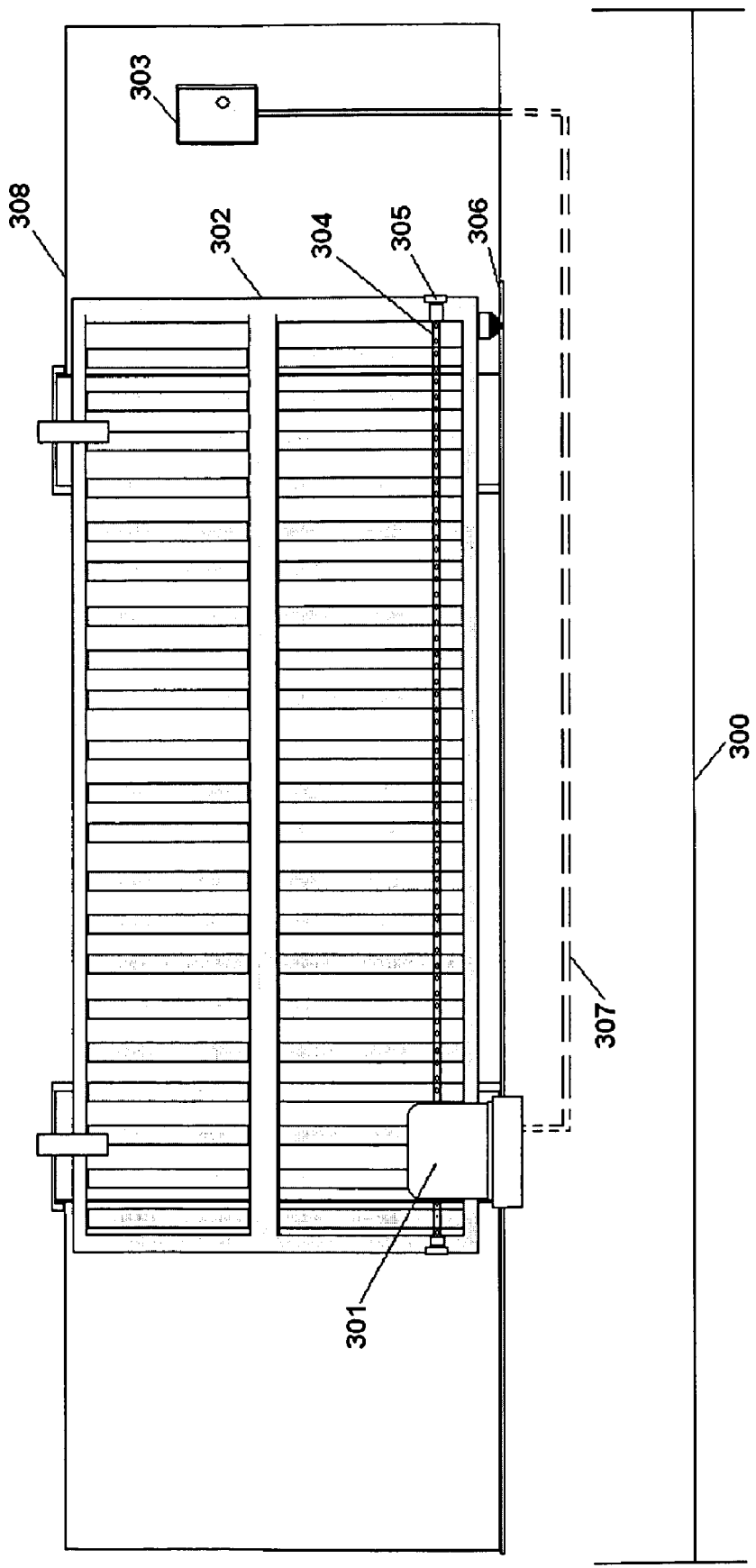
FIG. 3(a) illustrates one embodiment of the present invention wherein minimal equipment is used in the operation of a simple sliding gate by eliminating a gear system and implementing a hub motor with a movable barrier operator.

FIG. 3(a) illustrates one embodiment of the present invention wherein minimal equipment is used in the operation of a sliding gate by eliminating an external gear system, and retrofitting a movable barrier operator with a hub motor in accordance with the present invention.

FIG. 3(a) illustrates access system 300 comprising movable barrier operator 301, gate 302, controller 303, chain 304 (connected to gate 302 with chain bolt 305), and a gate support structure 308. By simply attaching chain 304 onto gate 302, gate 302 may be configured to operate automatically without the need for heavy equipment, complex installation, or additional components such as a gear box. One advantage in this design is its compact configuration. While conventional designs would require a larger control box or housing for movable barrier operator 301, a smaller and more efficient movable barrier operator 301 may be housed more efficiently, for example see FIG. 3(d).

Typically, gate 302 travels on track 306 utilizing chain 304 to transfer the mechanical force generated by movable barrier operator 301. Chain 304 may be coupled or attached to gate 302 by any appropriate method without deviating from the scope of the present invention. It may be desirable to implement a simple method of connecting chain 304 such as by using chain bolt 305 to attach said chain 304 to a lower portion of gate 302. This offers an inexpensive method in accord with the simplicity of the present invention.

Figure 3B:
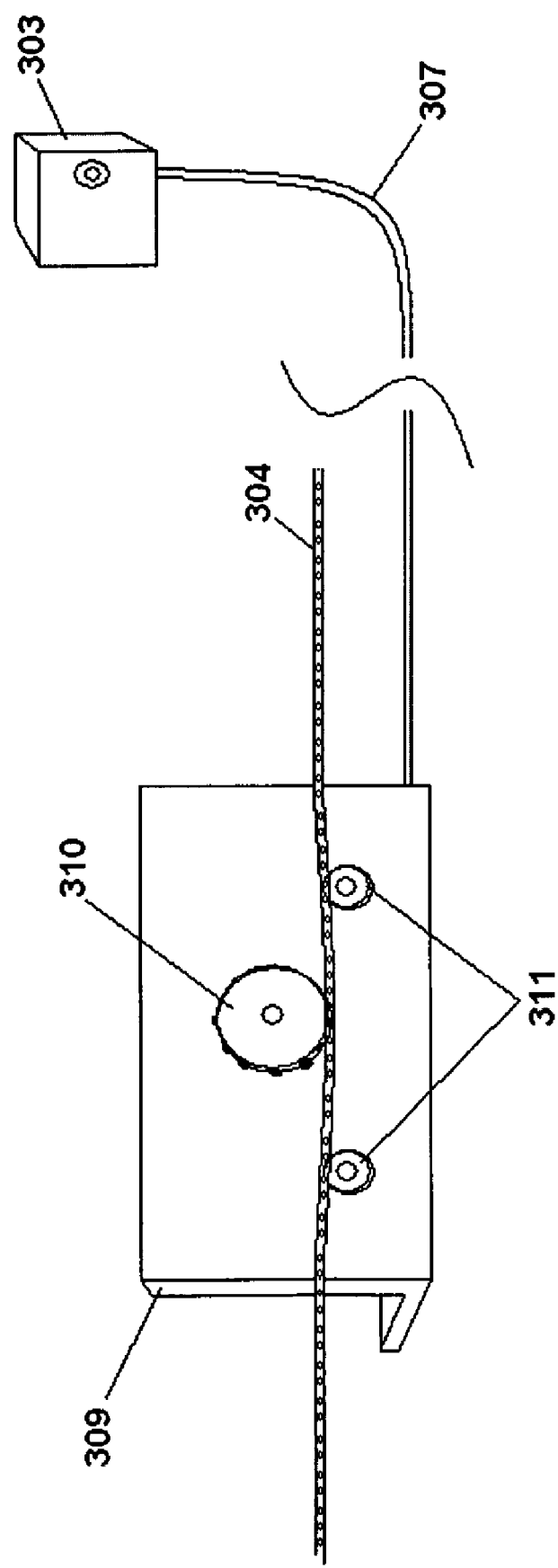
FIG. 3(b) illustrates a more detailed view of the various components that comprise the embodiment shown in FIG. 3(a).
Figure 3:
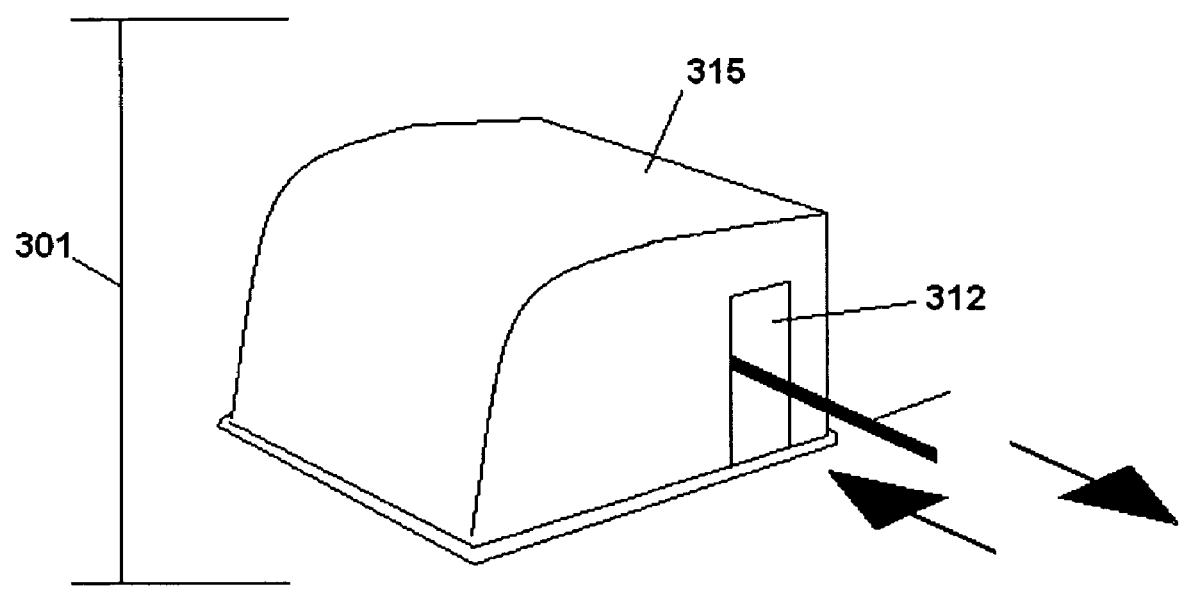
FIG. 3(c) illustrates a side view of movable barrier operator 301 shown above in FIG. 3(a) and FIG. 3(b), with housing 315 encasing the installation arrangement of a hub motor used to operate movable barrier 302 in accordance with one embodiment of the present invention.
FIG. 3(d) illustrates the internal configuration of movable barrier operator 301 which has been housed or encased in housing 315.

FIG. 3(b) illustrates a more detailed view of the various components that comprise the embodiment shown in FIG. 3(a), more specifically, FIG. 3(b) illustrates some inner components of movable barrier operator 301, which are controlled by controller 303 from a remote location to save space and further compact movable barrier operator 301.

Movable barrier operator 301 is typically mounted on a frame structure such as a chassis or frame 309. Movable barrier operator 301 is retrofitted with sprocket 310 so that sprocket 310 may be coupled with chain 304. Guiding wheels or idle sprockets 311 may be attached or installed onto frame 309 in order to keep chain 304 properly mounted and coupled with sprocket 310.

Although the embodiment illustrated shows movable barrier operator located in a lower portion of gate 302, movable barrier operator may be installed in any other location as long as movable barrier operator 301 is mechanically coupled to chain 304 in order to transfer the desired mechanical force from generated by its hub motor device to actuate and control said gate 302.

Typically, controller 303 is connected to movable barrier 301 using wire conduit 307 which runs from movable barrier 302 to some remote location on the premise where movable barrier operator has been installed. Controller 303 serves as the means to monitor and control movable barrier operator 301 so it is typically accessible to personnel which may access controller 303. However, and without limiting the scope of the present invention, controller 303 may be mounted directly onto frame 309.

In an exemplary embodiment, wire conduit 307 provides a direct line of communication between movable barrier operator 301 and controller 303 in addition to providing movable barrier operator 301 with a power source. This configuration may be desirable to keep movable barrier operator simple to install without the need for other components.

However, and without deviating from the scope of the present invention, in another embodiment, movable barrier operator 303 may be battery powered. A battery (not shown), connected to a small controller (not shown) may be installed or coupled to frame 309. Such controller may then be able to send and receive information wirelessly thus circumventing the need for wire conduit 307 and controller 310. Notably, this embodiment would require more sophisticated technology (presently available) which may increase the cost of movable barrier operator 301 and ultimately access system 300. Furthermore, attaching a controller and battery directly to frame 309 may require stronger materials for frame 309 and additional maintenance to movable barrier operator 301 to for example, assure that said battery is properly charged, etc.

Figure 3D:
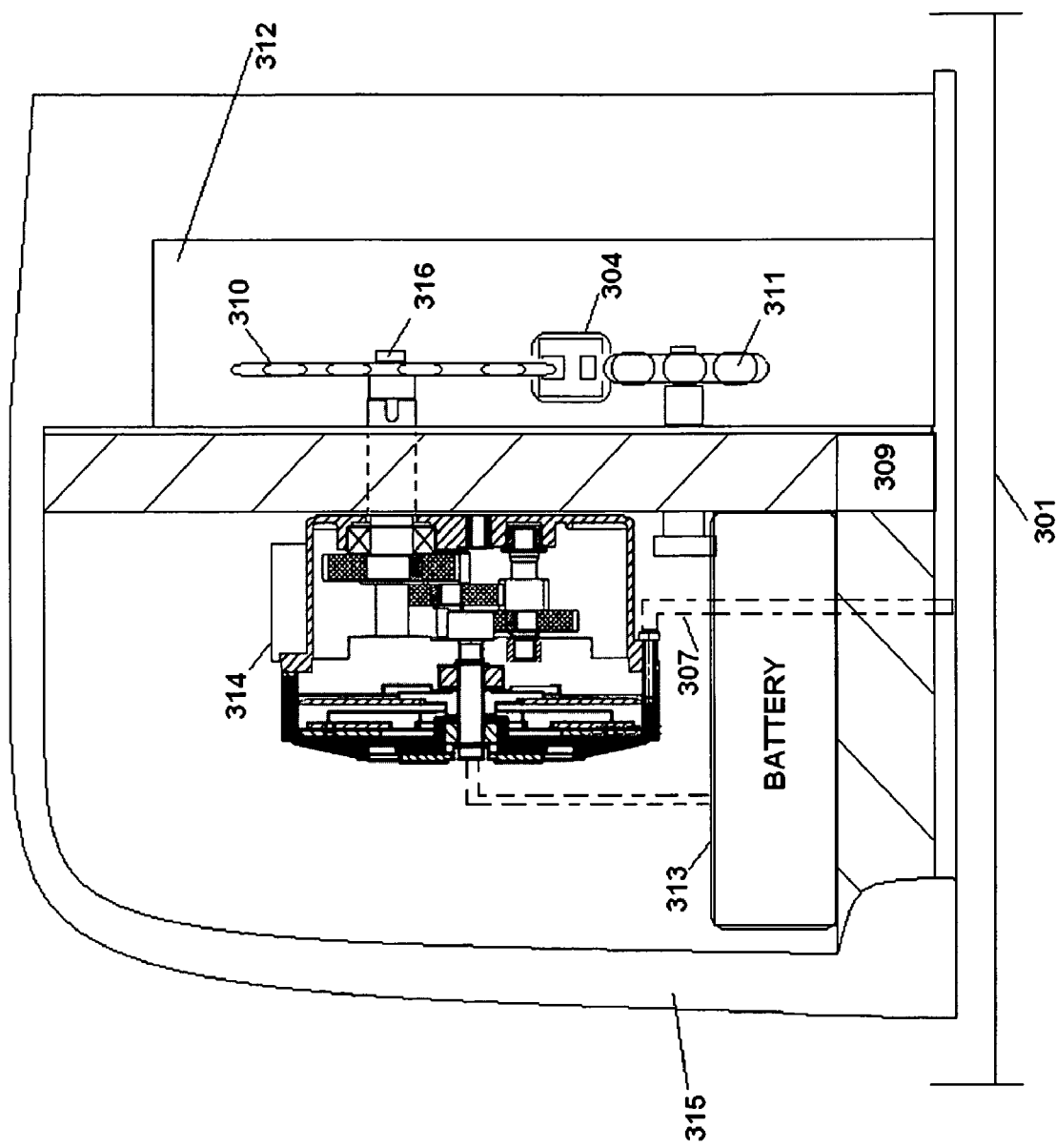

In an exemplary embodiment, frame 309 supports a hub motor, a battery (see FIG. 3(d)) and is covered by housing 315 to protect the various components and mechanical parts such as sprocket 310, idle wheels 311 and their mechanical contact with chain 304.

FIG. 3(c) illustrates such embodiment. FIG. 3(c) illustrates a side view of movable barrier operator 301 shown above in FIG. 3(a) and FIG. 3(b), with housing 315 encasing the installation arrangement of a hub motor used to operate movable barrier 302 in accordance with one embodiment of the present invention.

Housing 315 may be made of any known material proper for protecting movable barrier operator 301 from common wear and tear and in particular to protect its components from the elements. Housing 315 is shown with opening 312 to allow movement of chain 304 and protect movable barrier 301's connectivity with chain 304 and ultimately gate 302. While such covers or housings such as housing 315 are known in the art, they usually house a number of components including various types of electronics that must be implemented to smoothly actuate a movable barrier such as gate 302.

FIG. 3(d) illustrates the internal configuration of movable barrier operator 301 which has been housed or encased in housing 315. Hub motor 314 is supplied with an electrical power source via a rechargeable battery 313. Hub motor 314 is controlled via conduit 307 to operate gate 302. This simplistic design comprises attaching said hub motor 314 to frame 309 and coupling sprocket 310 to output shaft 316.

In an exemplary embodiment, sprocket 310 may be installed in a manner so that its mechanical contact with chain 304 allows hub motor 314 to move gate 302 at a substantially similar speed as the rotation of output shaft 316, with idle wheels 311 helping to keep chain 304 in proper place.

For example, and without limiting the scope of the present invention, hub motor 314 may be retrofitted with sprocket 310 directly on output shaft 316. As output shaft 316 is turned by hub motor 314, sprocket 310 and idle wheels 311 keep chain 304 in continuous contact so that the energy produced by hub motor 314 is properly used as mechanical energy to move chain 304 and operate gate 302. By rotating its output shaft 316 clock-wise and counter-clockwise, motor 314 is able to move chain 304 in a horizontal plane, thus sliding gate 302 back and forth, to and from, opened and closed positions; such movement being dictated by predetermined parameters a user may program via controller 310.

Hub motor 314 may receive a wide variety of signals pertaining to such parameters. For example, and without limiting the scope of the present invention, such parameters may include limits of operation for the close position of barrier operator 301, limits of operation for the open position, time delays for automatic functions such as automatic closing of gate 302, time delays for sending commands to a device such as another movable barrier in the same premises as access system 300, levels of sensitivity in detecting obstructions, voltage of operation for related devices, internal control voltages for different power supplies, and motor parameters such as speed and gate positions.

Depending on the complexity of the access system for which movable barrier operator 301 will be utilized, it may be desirable to adapt housing 315 and frame 309 in a manner so that the internal components of movable barrier operator 301 are especially protected.

For example, and without limiting the scope of the present invention, it may be desirable to construct frame 309 of a rigid material such as light metal. Housing 315 on the other hand may be preferred in a lightweight plastic that is durable and able to withstand various weather conditions. Frame 309 may be made of any material strong enough to hold a small motor such as hub motor 314 and the additional weight of chain 304, or may be adapted to support various other components such as sensor components, controller components, monitoring components, or any other additional hardware that be utilized with movable barrier operator 301. Additionally, housing 315 and frame 309 may be configured in such a way as to provide different mounting options for several types of gates or other kinds of movable barriers.

In one embodiment a metal material is used to manufacture frame 309 which may be drilled or retrofitted with mounting fixtures in order to allow installation of frame 309 directly onto a structure, for example to rest on a top portion of gate support structure 308 and hang over gate 302. Such embodiment would further comprise of positioning chain 304 on a top portion of gate 302 so as to make mechanical contact with movable barrier operator 301. In another embodiment, discussed below in reference to FIG. 5, frame 309 may be configured for universal installation on a variety of sizes of gates.

In yet another embodiment, it may be desirable to add a cosmetic cover to frame member 306 for aesthetic purposes. A cover may provide protection from exposure and keep sprocket 308, sprockets 307 and motor 400 from being damaged by the weather.

Figure 4:
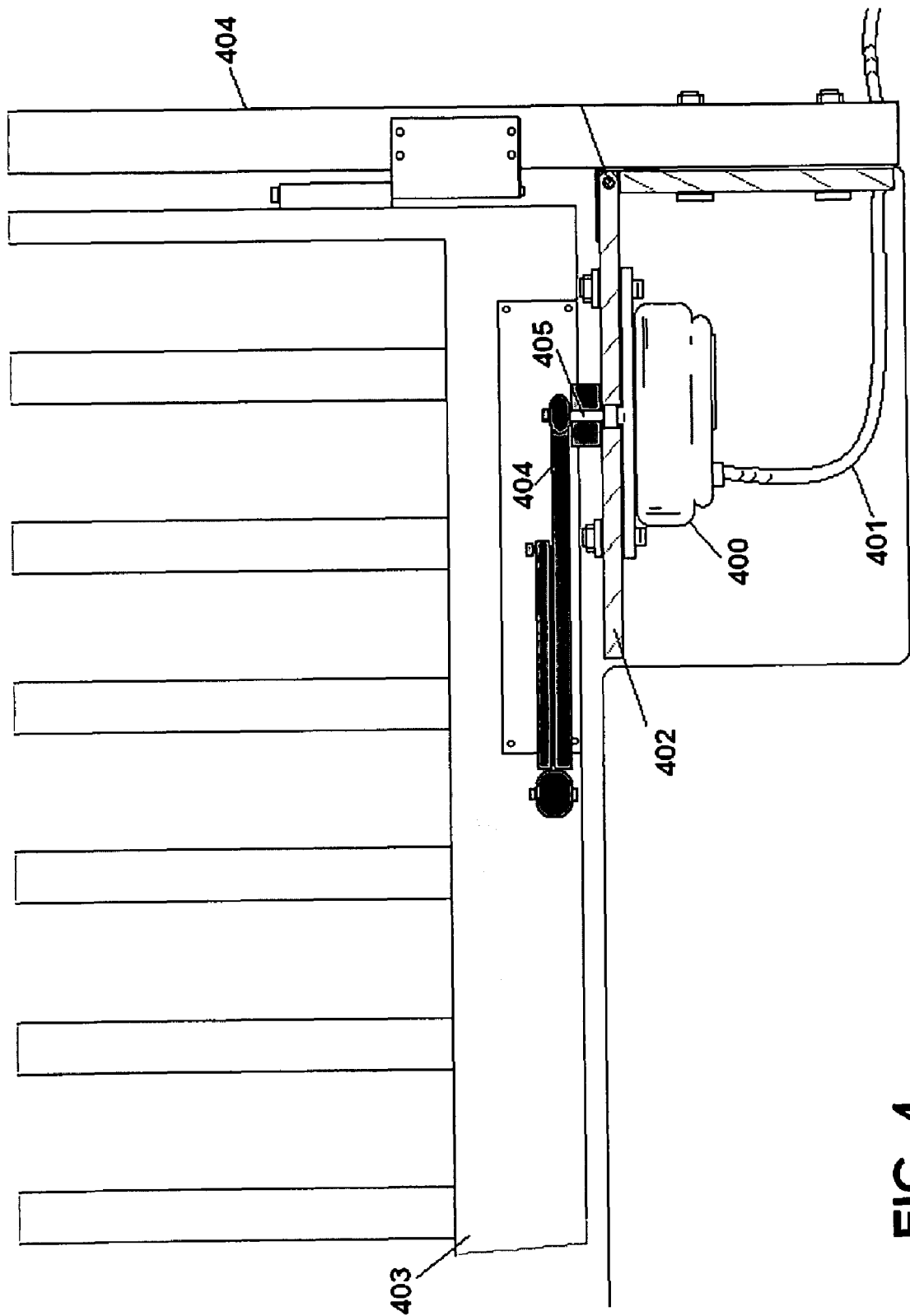
FIG. 4 illustrates yet another embodiment in accordance with the present invention wherein a movable barrier operator is coupled directly to a movable barrier, for example a gate, without the need for external gears or belt systems to optimize actuation, while preserving space.

FIG. 4 illustrates yet another embodiment in accordance with the present invention wherein a movable barrier operator is coupled directly to a movable barrier, for example a gate, without the need for external gears or belt systems to optimize actuation, while preserving space. A simple design utilizing a hub motor can achieve these objectives wherein the hub motor is placed underneath a gate.

Movable barrier operator 400 comprises hub motor 401 which has been mounted underneath gate 403. Movable barrier operator 400 further comprises casing 402 installed at least partly underground, articulated arm 404 which connects with motor 401's output shaft 405, and is supplied power from a remote source (not shown) via conduit 406.

Hub motor 401 may be held in place against casing 402 by bolts; hinge 407 allows casing 402 to swing open and allow a user, for example an installer, to access motor 401. Furthermore, to add stability, casing 402 may be reinforced against post 404 via bolts or any other known method.

This simple, compact design allows for movable barrier operator 400 to be placed at nearly any type of access system including access systems designed for indoors. For example, and without limiting the scope of the present invention, movable barrier operator 400 may be installed at premises wherein a high level of security is required, thus requiring heavy barriers or gates that must be automated in order to actuate. Such doors typically require high torque which is usually attained with heavy gearing, beltways or pulley systems. Utilizing movable barrier operator 400 with hub motor 401 may streamline such access systems with fewer components, less maintenance, and higher power output.

Figure 5:
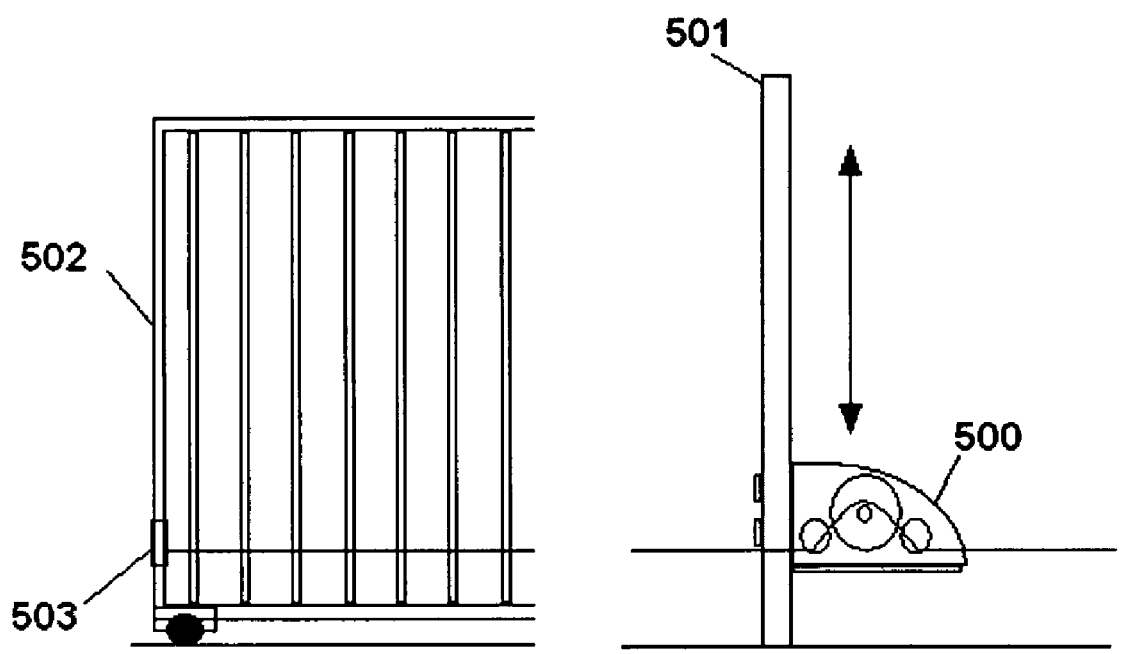
FIG. 5 illustrates one embodiment of the present invention that is easily adaptable to various shapes and sizes of barriers, for example different types of gates, do to its small size and lack of external gear system.

Turning to the next figure, FIG. 5 illustrates one embodiment of the present invention that is easily adaptable to various shapes and sizes of barriers, for example different types of gates, do to its small size and lack of external gear system.

Movable barrier operator 500 is similar to movable barrier operator 301, however, movable barrier operator 500 has been configured to be universally adaptable. As shown, movable barrier operator 500 may be installed on post 501 so as to be able to slide up and down post 501 depending on the size of gate 502 or positioning desired for a particular application.

For example, and without deviating from the scope of the present invention, gate 502 may be a gate located in a geographical are wherein harsh weather such as snow often fall. To prevent rust and damage, an installer or user may decide to mount movable barrier operator 500 at high position on post 501. Naturally, chain 504 and chain bolt 503 would need to be similarly position so as to allow proper operation of gate 501.

In another example, gate 502 is located in a luxurious gated community wherein aesthetically pleasing designs are preferred. In such embodiment movable barrier operator may be placed very low to the ground in an inconspicuous place so as to position chain 504 running along a covered foot of gate 502.

Figure 6A:
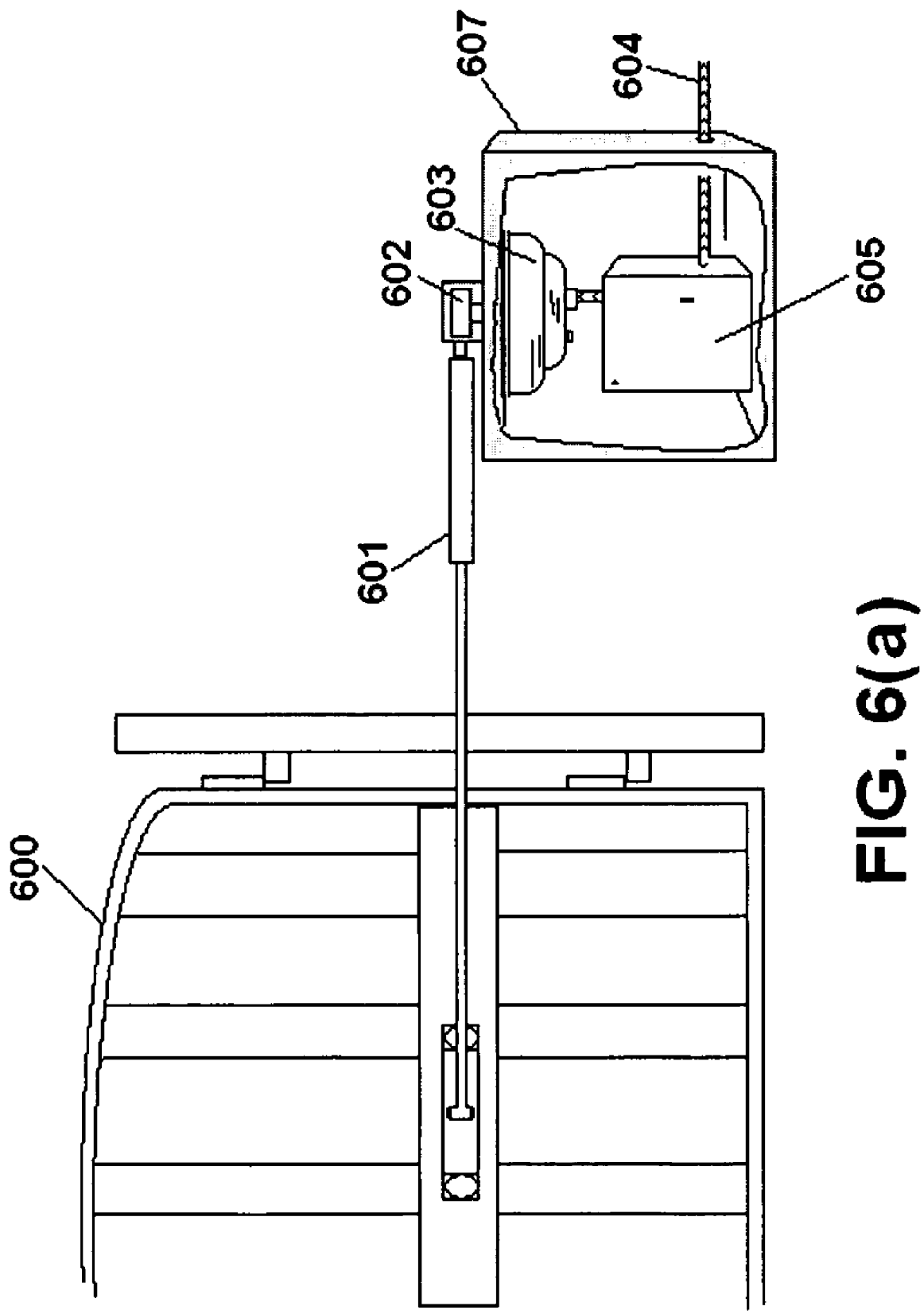
FIG. 6(a) illustrates another embodiment in which a small control box contains necessary components for a movable barrier operator.
Figure 6B:
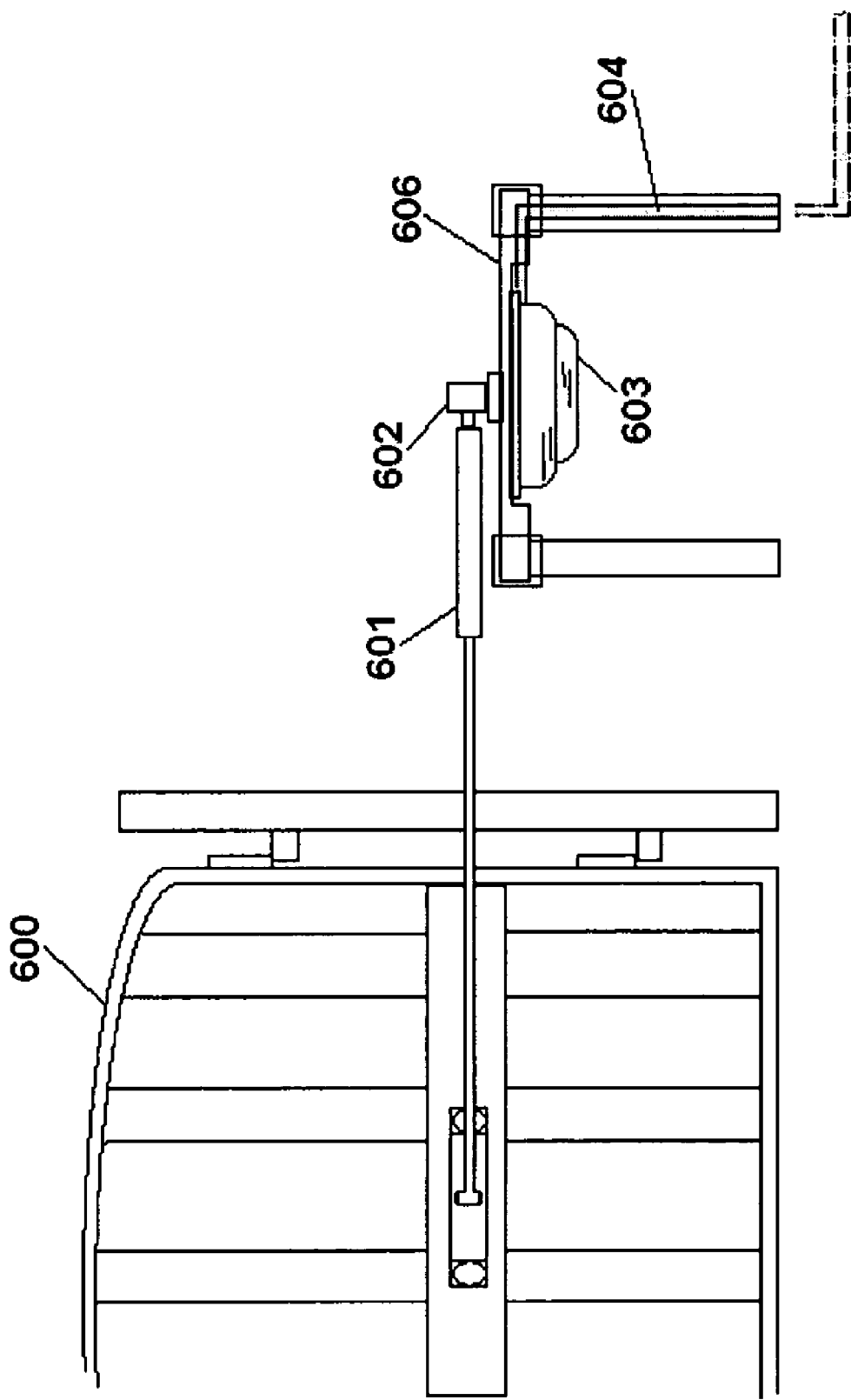
FIG. 6(b) illustrates a similar embodiment of the present invention wherein a motor hangs from a post; this simpler design incorporates the use of a remote location for the controller and power source.

FIG. 6($a$) illustrates another embodiment in which a small control box contains all necessary components for a movable barrier operator, and FIG. 6($b$) illustrates a similar embodiment of the present invention wherein a motor hangs from a post; this simpler design incorporates the use of a remote location for the controller and power source.

Both embodiments consist of gate 600, articulated arm 601, clutch 602, hub motor 603, and wire conduit 604. The embodiment illustrated in FIG. 6($a$) further comprises a control box 607 which houses controller 605 and hub motor 603. This embodiment may be desirable to protect a movable barrier operator from tough conditions, for example in agricultural settings or geographical locations that experience extreme weather. Typically control box 607 is constructed of a durable light weight material and may be easily removed for maintenance or updating controller 605's firmware.

As hub motor 603 rotates, its output shaft generates mechanical energy, thus clutch 602, being attached to said hub motor 603, turns articulated arm 601 to swing open gate 600. Naturally, the embodiment illustrated in FIG. 6($b$) operates gate 600 in a similar fashion.

A desirable advantage of the later embodiment is the elimination of parts and components to operate gate 600. Instead of controller case 607, hub motor 603 hangs from a support beam 606, for example a post or similarly simple fixture—this provides easy access to the motor in case a replacement is required or adjustments need to be performed. In an exemplary embodiment, support beam 606 is adjustable to allow users flexibility when installing.

Furthermore, instead of installing the controller by gate 600, controller 605 (not shown in FIG. 6($b$)) is positioned in a remote location accessible to an installer or user. For example, and without deviating from the scope of the present invention, controller 605 is located inside a building which provides a power source (not shown) and communicates with hub motor 603 for remotely monitoring or operation purposes via conduit 604.

Figure 7:
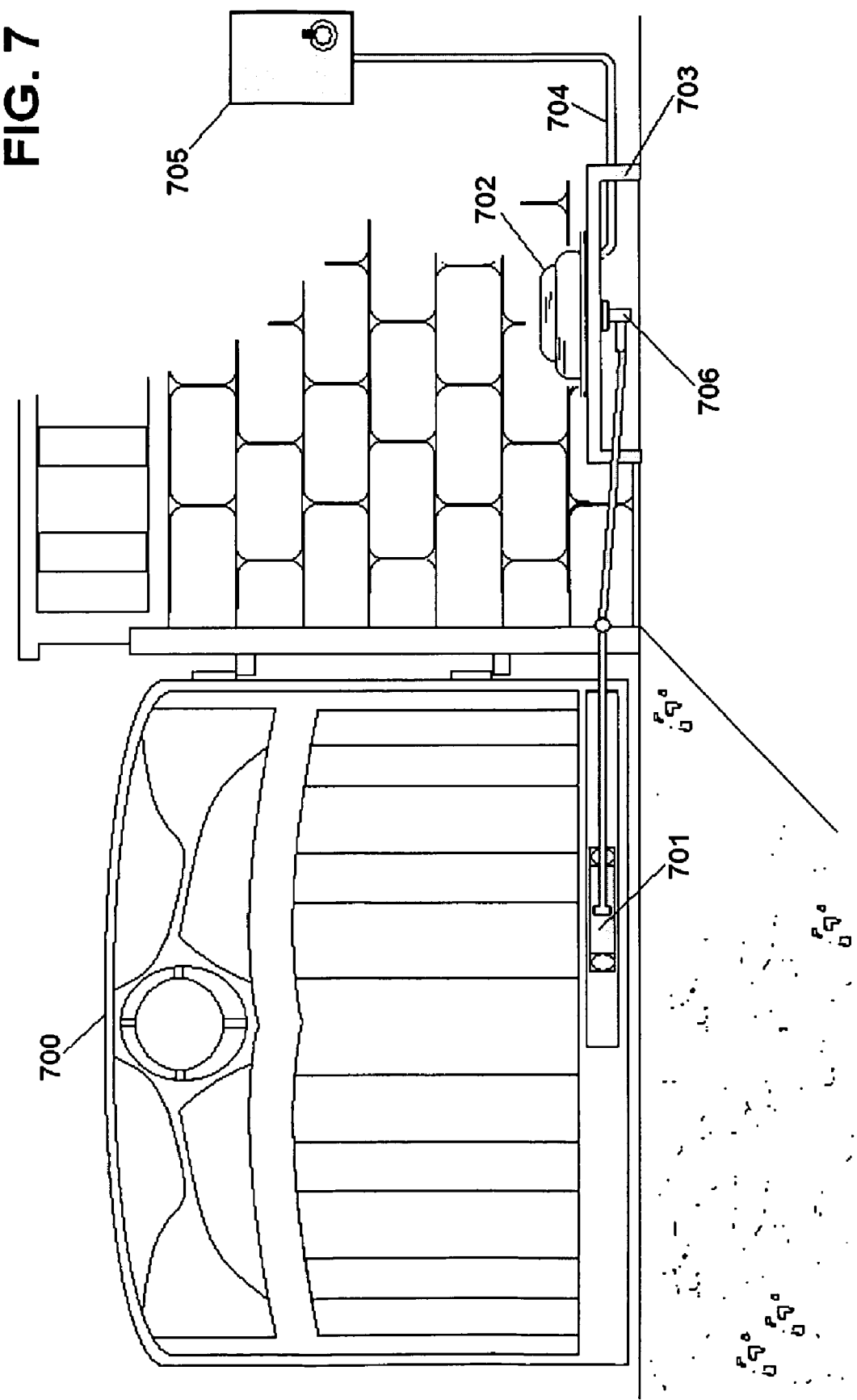
FIG. 7 illustrates yet another embodiment in accordance with the present invention, in which a movable barrier operator may be installed very low to the ground to avoid installing large fixtures on a user's property and preserve aesthetic appeal, for example, of an expensive swing gate at the entry point of a large estate.

FIG. 7 illustrates yet another embodiment in accordance with the present invention, in which a movable barrier operator may be installed very low to the ground to avoid installing large fixtures on a user's property and preserve aesthetic appeal, for example, of an expensive swing gate at the entry point of a large estate. This embodiment of the present invention comprises swing gate 700, articulated arm 701, hub motor 702, base 703, conduit 704, and controller 705.

Hub motor 702 is exposed so as to provide easy access in case of repair or replacement. A power source may be located inside a home, for example, and provided to Hub motor 702 via conduit 704. Similarly, controller 705 may too be located inside said home (not shown) for access by users.

Base 703 supports hub motor 702 while allowing a clearance from the ground. By placing clutch 706 low to the ground, articulated arm 701 is able to operate swing gate 700 without interfering with the aesthetic appeal of swing gate 700. This configuration is very desirable in the gate industry with particular preference of clients that spend many thousands of dollars on such expensive gates, and who desire to have components such as articulated arm 701 hidden away or away from view of, for example, swing gate 700.

Since the present invention for a movable barrier operator eliminates the need for complex belt systems, additional external gear boxes, or phase control mechanisms, a user is provided with the flexibility to position, mount, or install a movable barrier operator in accordance with the present invention, in a wide range of configurations depending on a user's needs.

Figure 8:
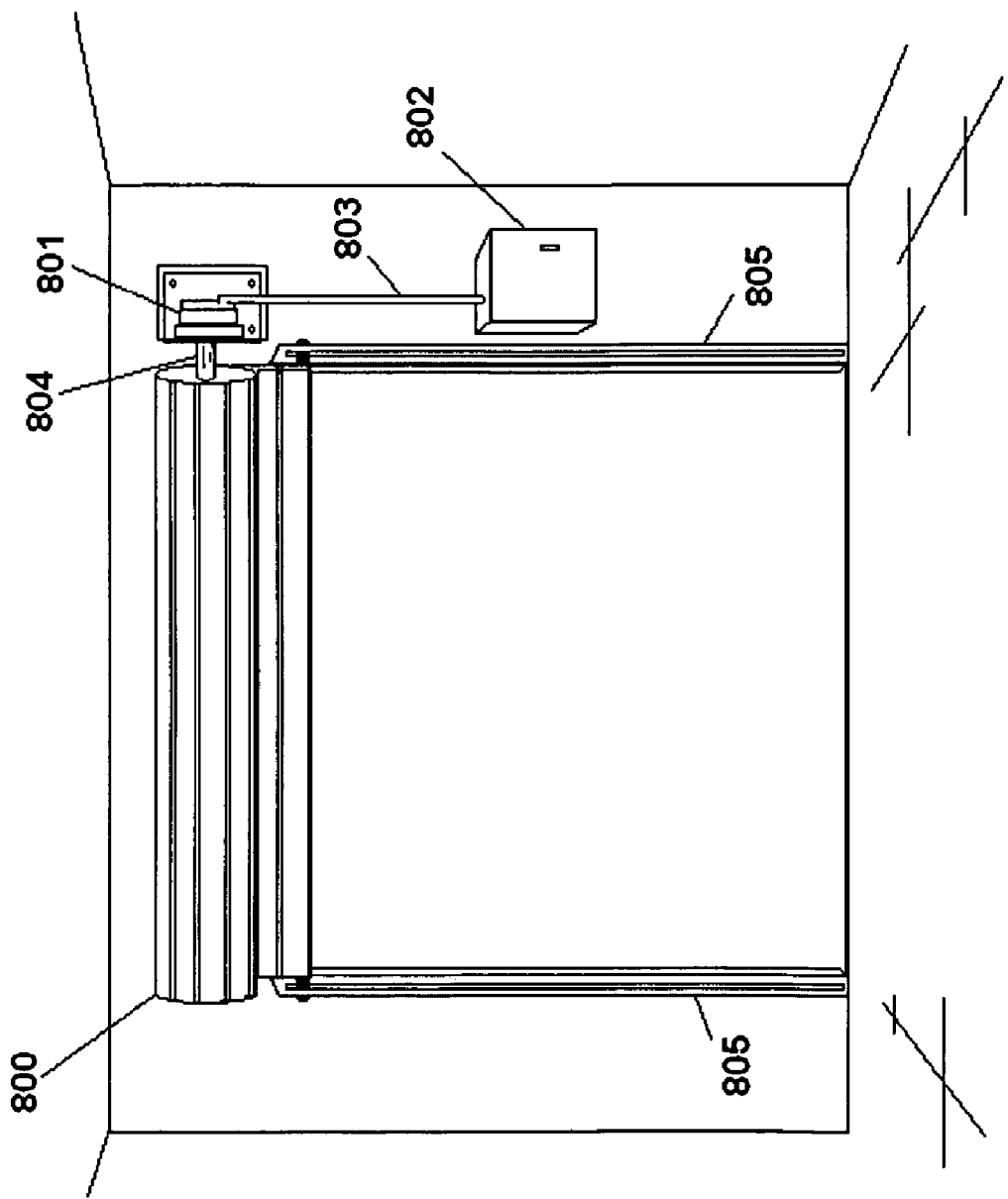
FIG. 8 illustrates yet another embodiment in accordance with the present invention wherein a movable barrier operator is installed directly to another type of barrier, by way of example, a roll-up gate, without the need for gears or belt systems to optimize actuation and preserve space.

FIG. 8 illustrates yet another embodiment in accordance with the present invention wherein a movable barrier operator is installed directly to a barrier's drive mechanism, for example a roll-up gate, without the need for gears or belt systems to optimize actuation and preserve space.

Normally a roll-up door such as roll-up door 800 must use beltway systems or a gearbox in order for a conventional motor to properly and smoothly actuate door 800. And even with the use of conventional gear systems to move such barriers, actuation and operation is often rough due to the low torque at slow speeds. Such conventional means of moving a barrier need additional components in order to control the frequency of a voltage fed to a conventional motor. Without the use of any external gear box or additional external gearing, hub motor 801 may be mounted and installed directly into door 800's main drive mechanism with few modifications.

The remaining equipment would only comprise conduit 803 to provide communication and power from controller 802, where users may monitor and control door 800's operation. Upon actuation, door 800 may be rolled up or rolled down, being held in place and guided by tracks 805, from a close position to an open position and vice-versa.

Hub motors in accordance with the present invention are a compact motor that uses electromagnetic properties to create mechanical work with minimal energy loss. These motors offer very high torque at very low speeds thus making these motors ideal tools to implement with an access system.

A movable barrier operator in accordance with the present invention can be used with any access system that controls a barrier to an entry, an exit, or a view, utilizing hub motors. The barrier could be a door for a small entity (i.e. a vehicle), or a gate for a large entity (i.e. a building), which can swing out, slide open, fold or even roll upwards.

A compact movable barrier operator in accordance with the present invention may be implemented in a variety of embodiments for a wide range of applications. For example, and without limiting the scope of the present invention, a hub motor operated movable barrier operator in accordance with the present invention may be a swing gate operator, a window operator, a garage door operator, a slide gate operator, a roll-up door operator, a sliding-door operator, a regular door operator, a revolving door operator, a vehicular door operator, or a vehicular top operator (e.g. a top for a convertible vehicle).

Furthermore, this disclosure does not necessarily exclude the implementation of any type of gearing system in conjunction with a hub motor operated movable barrier operator as defined herein, however, the reduction of external parts, reduced maintenance, and all other advantages served by a system which excludes external gearing is desirable. Nevertheless, an embodiment in which some type of gearing system is implemented with a hub motor does not deviate from the scope of the present invention.

A system for high torque operation of a movable barrier utilizing a compact hub motor device has been described. Clearly, many of the components described in the various embodiments of the present invention may be substituted with other equivalent components without deviating from the scope of the present invention. For example, pulleys and belts may substitute chains and sprockets utilized to actuate a movable barrier. The foregoing description of the various exemplary embodiments of the invention has been presented for the purposes of illustration and disclosure. It is not intended to be exhaustive or to limit the invention to the precise form disclosed. Many modifications and variations are possible in light of the above teaching. It is intended that the scope of the invention not be limited by this detailed description, but by the claims and the equivalents to the claims.

What is claimed is:

1. An access system comprising:
    a slide gate adapted to move on a track,
    a hub motor, wherein said hub motor further comprises:
        at least one stator magnetically coupled to a rotor, and
        at least one or more internal gears rotably coupled to said rotor;
    a sprocket rotably coupled to said one or more internal gears;
    a chain directly coupled to said sprocket and said movable barrier in a manner so that said movable barrier moves at a substantially the same speed as a rotation speed of said sprocket, wherein said chain runs substantially parallel to said track;
    an idle wheel for maintaining said chain mechanically connected to said sprocket;
    a controller adapted to control said rotation of said hub motor; and
    a sensor connected to said controller, said sensor adapted to generate a signal after detecting a predefined event.

2. The movable barrier operator of claim 1, further comprising:
    a controller adapted to control said rotation of said motor; and
    a sensor connected to said controller, said sensor adapted to generate a signal after detecting a predefined event.

* * * * *